United States Patent [19]

Beckwith

[11] Patent Number: 4,947,903
[45] Date of Patent: Aug. 14, 1990

[54] MATERIAL RECOVERY APPARATUS

[76] Inventor: Robert H. Beckwith, Ballwin, Mo.

[21] Appl. No.: 261,170

[22] Filed: Oct. 21, 1988

[51] Int. Cl.⁵ .............................................. B65B 1/16
[52] U.S. Cl. ...................................... 141/67; 141/46;
141/59; 141/249; 55/218; 55/432; 406/168;
406/171
[58] Field of Search ................. 141/93, 44, 45, 46,
141/59, 67, 65, 249; 209/643; 406/168, 171;
55/218, 432; 99/323.9, 323.11; 417/279

[56] References Cited

U.S. PATENT DOCUMENTS

| | | | |
|---|---|---|---|
| 3,304,219 | 2/1967 | Nickerson | 428/327 |
| 3,381,327 | 5/1968 | Kelley | 15/314 |
| 3,556,172 | 1/1971 | Mencacci | 141/11 |
| 3,667,593 | 6/1972 | Pendleton | 206/46 FR |
| 3,816,982 | 6/1974 | Regnault | 55/432 |
| 4,141,391 | 2/1979 | Smith | 141/59 |
| 4,142,560 | 3/1979 | Eisenberg | 141/12 |
| 4,194,262 | 3/1980 | Finley et al. | 15/321 |
| 4,691,407 | 9/1987 | Sloan et al. | 55/432 |
| 4,704,144 | 11/1987 | LeBlanc et al. | 55/432 |
| 4,813,462 | 3/1989 | Linn | 141/93 |

FOREIGN PATENT DOCUMENTS 2505984 9/1976 Fed. Rep. of Germany ...... 406/171

OTHER PUBLICATIONS

Poly-Vac Brochure and cover letter dated Nov. 17, 1987.

Primary Examiner—Ernest G. Cusick
Assistant Examiner—Edward C. Donovan
Attorney, Agent, or Firm—Rogers, Howell & Haferkamp

[57] ABSTRACT

A loose material recovery apparatus such as for recovering foam plastic packaging elements has an overhead bin for containing the material. The bin has a storage chamber for storing the material and an outlet from which the material in the bin is dispensed. A vacuum assembly above the storage chamber includes a container having a bottom door, an actuating member, and a motor. A storage compartment is defined within the container between the motor and the bottom door. The bottom door is mounted for movement between a closed position for retaining the material in the storage compartment and an open position allowing the material to fall from the compartment into the bin storage chamber. When the motor is energized movement is imparted to the actuating member to close the bottom door and create a vacuum in the storage compartment for drawing material to be recovered into the compartment through a suction hose.

23 Claims, 2 Drawing Sheets

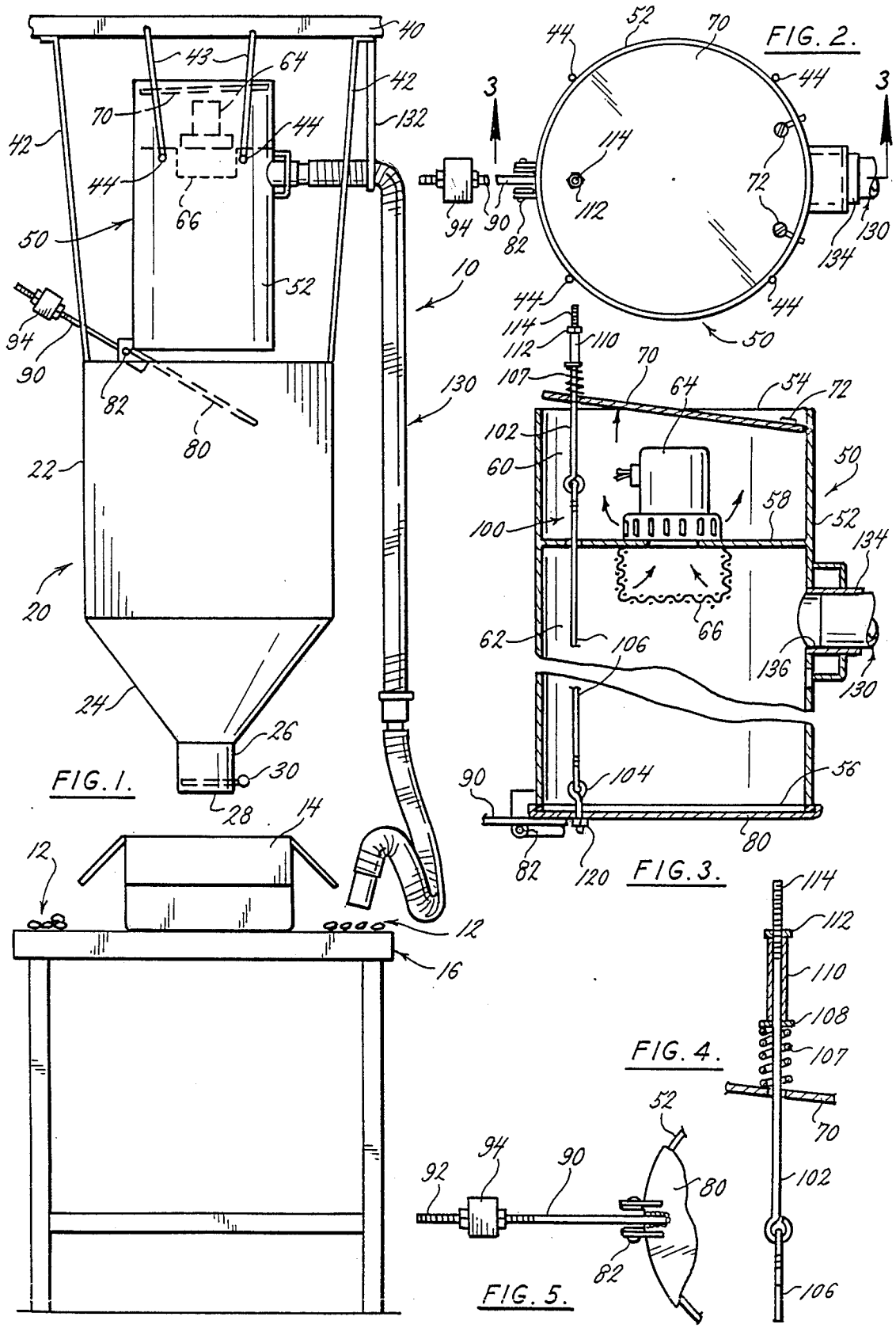

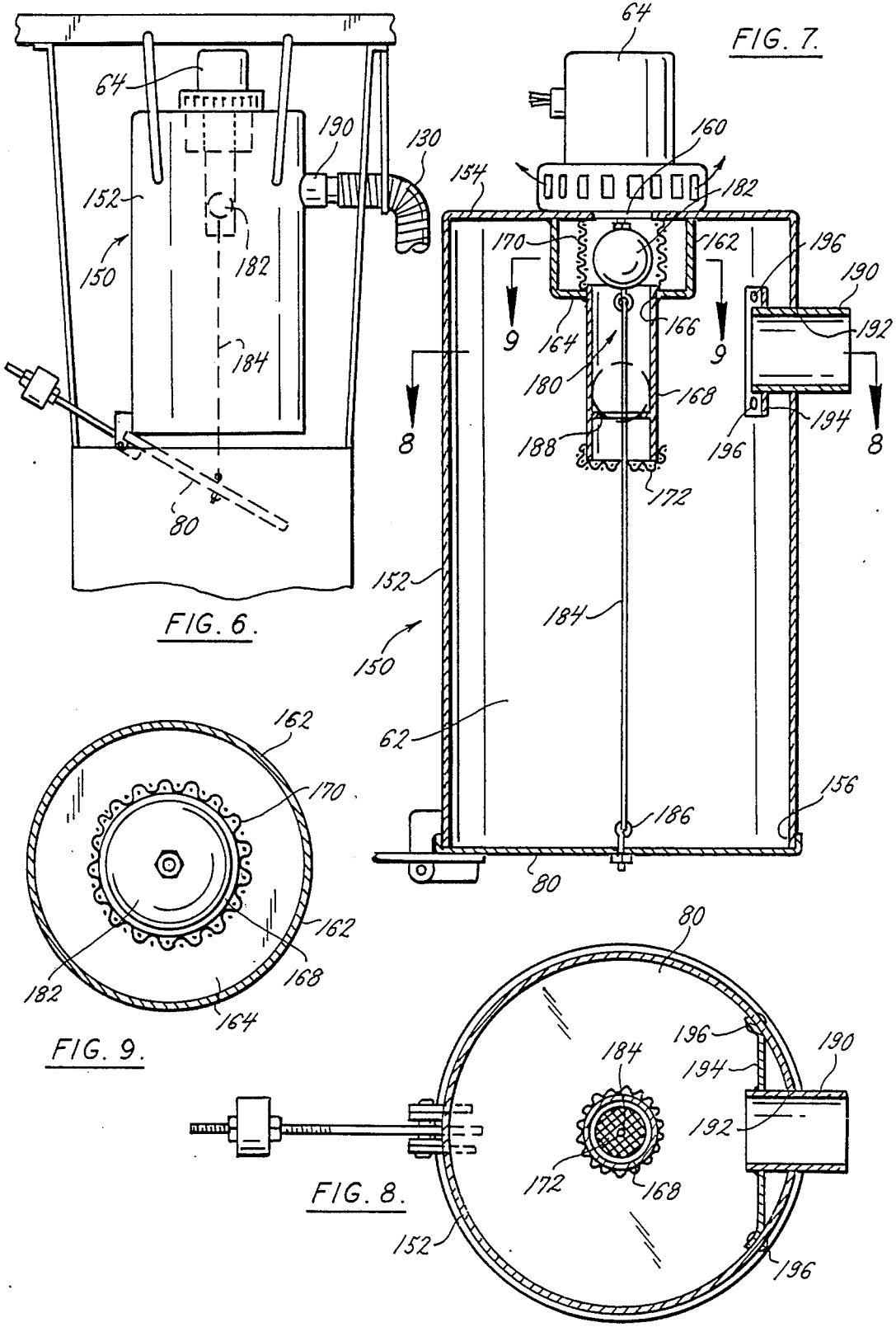

MATERIAL RECOVERY APPARATUS

BACKGROUND AND SUMMARY OF THE INVENTION

This invention generally relates to an apparatus for the recovery of loose material, and more particularly for the recovery of material such as foam plastic packaging elements of the type used for protecting the contents of a container against damage.

Such elements take different physical shapes, some shaped like peanuts, shells, or other suitable shape. However, common characteristics of such elements are that they are small enough to fill the various cavities and voids surrounding the article to be protected within the box or container, they provide effective protection against damage due to impact, they are a plastic foam construction, and they are very light weight. One of the disadvantages of this packaging material is that it easily spills.

One familiar way to use this packaging material has been to store the elements in an overhead bin having a bottom opening through which the elements are dispensed. As the boxes or cartons, with the contents to be protected therein, are moved beneath the bin, the packaging elements are dispensed from the bin into the box. Unfortunately, a good many of the elements spill onto the table, conveyor, or floor, and then must be swept up or otherwise cleaned up and either recycled or discarded. The recovery appaaratus of the present invention provides for the easy clean up and recovery of excess or spilled material of this type by means of a unique vacuum assembly. Similarly, the vacuum assembly may be used to remove the material from boxes of previously packaged items for purposes of unpacking the items.

Apparatus for recovering particulate material or elements used for filling containers is exemplified by U.S. Pat. No. 3,556,172. Moreover, the recovery of energy absorbing materials by means of a vacuum is shown by U.S. Pat. No. 3,304,219. However, the recovery apparatus and vacuum assembly of the present invention provides particular ease and efficiency in recovering packaging and similar material as described above.

The material recovery apparatus of the present invention generally includes an overhead bin for containing the material, the bin having a storage chamber for storing the material and an outlet from which the material in the bin may be dispensed into containers positioned beneath the bin. A vacuum assembly is located above the storage chamber and includes a container having a bottom door, an actuating member, and a motor. The motor is mounted in a barrier wall within the container such that the space between the barrier wall and the bottom door defines a storage compartment. The bottom door is mounted to the container for movement between a closed position for retaining the material in the storage compartment and an open position allowing the material to fall from the storage compartment into the bin storage chamber. The actuating member is mounted to the container for movement in response to energizing the motor. A linkage interconnects the actuating member and the lower door. When the motor is energized, the actuating member moves. This movement of the actuating member operates through the linkage to close the lower door thus creating a vacuum in the storage compartment. A suction hose is connected to the vacuum assembly and communicates with the storage compartment for directing the material back to the storage compartment for recovery of the material. When the motor is deenergized the lower door is allowed to open and the recovered material drops into the bin storage chamber.

The recovery apparatus of the present invention has the advantages of being inexpensive and yet particularly effective for recovering material of the type described.

DESCRIPTION OF THE DRAWINGS

FIG. 1 is a side elevation view of a material recovery apparatus of the present invention.

FIG. 2 is a top view of the vacuum assembly of the present invention taken along the line 2—2 of FIG. 1.

FIG. 3 is a view in section taken generally along the line 3—3 of FIG. 2.

FIG. 4 is a sectional view showing the upper portion of the linkage used in the invention.

FIG. 5 is a bottom view showing the hinge arrangement for the bottom door of the vacuum assembly.

FIG. 6 is a side elevation view of a modified embodiment of the material recovery apparatus of the present invention.

FIG. 7 is a view similar to FIG. 3 and showing the modified embodiment.

FIG. 8 is a view in section taken generally along the line 8—8 of FIG. 7.

FIG. 9 is a view in section taken generally along the line 9—9 of FIG. 7.

DETAILED DESCRIPTION OF A PREFERRED EMBODIMENT

With reference to the drawing there is shown a material recovery apparatus 10 of the present invention for recovering a loose material 12 of a type heretofor described such as foam plastic elements used in packaging. While the apparatus is particularly suited for recovering such material, it is suited for recovering any loose material that can be vacuumed and that otherwise has properties compatible with the structure and operation of the apparatus. The elements may be dispensed, as in a filling operation, into a container or box 14 located beneath the apparatus and supported on a table, conveyor, or the like 16. Similarly, previously filled boxes may be positioned for removing the elements as in an unpackaging operation.

The apparatus 10 includes a bin 20 which may have a cylindrical portion 22 and a lower conical portion 24 with a neck portion 26 at the bottom thereof. The neck portion 26 defines a bottom opening 28 through which the material may be dispensed. The bin has a door 30 at the neck opening. The door 30 may be slidable, pivotable, or otherwise mounted to move between an open and closed position. Also, the door may be operated in any suitable manner either manually or power operated. The portion of the bin above the door 30 defines a bin storage chamber for storing the material to be dispensed. The bin may be rigidly formed or may be of light weight flexible material such as plastic or canvas.

The bin 20 may be supported from the ceiling or an upper frame support 40 by means of vertical supports 42. Also supported from the frame member 40 such as by means of vertical supports 43 connected to eyelets 44 is a vacuum assembly 50.

The vacuum assembly 50 includes a generally cylindrical container 52 having a top opening 54 and a bottom opening 56. The container has a barrier wall 58 separating the container into an upper compartment 60 and a lower storage compartment 62. An electric vacuum motor 64 is centrally mounted in the wall 58 and when energized draws air from the compartment 62 into the compartment 60. The barrier wall 58 is a solid wall so that the only communication between the two compartments is by way of the motor 64. A suitable screen 66 covers the motor inlet on the chamber side 62 to prevent the vacuumed material from clogging the motor inlet.

An actuating member or lid 70 is pivotally mounted at hinge locations 72 near the upper opening 54 of the container. In this preferred embodiment the lid is a disk that almost completely closes the upper opening of the container. A lower door 80 is pivotally attached at the lower opening 56 of the container by a hinge 82. Hence, the lower door 80 is pivotally attached to move between a closed position as shown in FIG. 3 for retaining the material in the storage compartment and an open position as shown by dashed lines in FIG. 1 for releasing the material and allowing it to fall from the compartment into the bin storage chamber. A rod 90 having a threaded portion 92 extends from the door 80 in an opposite direction from the hinge and has a counterweight 94 threadedly engaged thereon. The counterweight is adjustable along the threaded rod for ease in closing the door upon energizing the motor as will be described.

A linkage 100 extends between the lid 70 and door 80. The linkage includes an upper eyelet rod 102, a lower eyelet rod 104, and a cable 106 connected therebetween. The upper eyelet rod 102 extends through an opening in the lid 70 located near the edge of the lid away from the hinges 72. A spring 107 surrounds the rod between the lid and a washer 108. On top of the washer is a spacer 110 and a nut 112 threadedly engaged on a threaded portion 114 of the eyelet rod. The eyelet rod 104 extends through an opening in the door 80 located near the hinge 82, and is secured in place by a nut 120.

A suction hose 130 is supported by a suitable bracket 132 from the upper frame 40 and extends downwardly with its lower end easily accessible for placing in proximity to the material 12 to be recovered. The upper end of the hose is connected to a suitable cylindrical fitting 134 that communicates through an opening 136 in the side wall of the container with the storage compartment 62.

By way of operation, with the motor 64 deenergized the door 80 falls by its own weight to the open position of FIG. 1. In doing so it pulls the linkage 100 downwardly which in turn causes the lid 70 to pivot in a counterclockwise direction about its hinges as viewed in FIG. 3. A suitable stop can be provided to limit the degree to which the door 80 opens. When the motor 64 is energized it draws air from the compartment 62 and forces the air to impinge against the lid 70. This causes the lid to pivot clockwise about its hinges and lift the linkage 100. This in turn lifts the door 80 causing it to pivot counterclockwise about its hinge to the closed position shown in FIG. 3. When the door 80 closes a vacuum is created in the compartment 62 to draw the material 12 through the suction hose and into the storage compartment 62.

After the material is removed the motor is deenergized allowing the lid 70, linkage 100, and door 80 to drop back to the positions whereby the door 80 is open and the vacuumed material is released back into the bin storage chamber.

The spring 107 acts as a cushion when the door 80 opens and closes, and the linkage may be adjusted by way of the nut 112 to adjust the relative movements of the lid 70 and door 80 to insure that the door closes upon energizing the motor.

FIGS. 6–9 show a modified embodiment of the invention having a somewhat different arrangement for the vacuum assembly, actuating member, and fitting for the suction hose.

The vacuum assembly 150 of this modified embodiment is similar to the vacuum assembly of the first described embodiment. It includes a generally cylindrical container 152 having a top 154 and a bottom opening 156. There is no barrier wall as with the first described embodiment. Instead, the electric motor 64 is centrally mounted to the top of the container over an opening 160.

A sleeve 162 extends downwardly from the top and surrounds the opening and has an annular flange 164 with an opening 166 directly beneath the opening 160. A tube 168 extends within the opening 166 and extends downwardly therefrom. A suitable cylindrical screen 170 is concentric with the sleeve 162 and extends between the top 154 and flange 164. Another screen 172 covers the bottom opening of the tube. The screens prevent the vacuumed material from clogging the motor inlet.

The actuating member of this modified embodiment comprises a ball assembly 180 including a ball 182 mounted for vertical movement within the tube 168 and sleeve 162. The ball is connected by a line 184 to the door 80 by means of an eyelet 186. The ball assembly may also include a stop 188 within the tube 168 for limiting the lower travel of the ball.

The fitting arrangement for attaching the suction hose 130 may be used with either the vacuum assembly of this modified embodiment or of the first described embodiment. It comprises a cylindrical fitting 190 extending through an opening 192 in the wall of the container and secured at its inner end to a bracket 194 attached such as by rivets 196 to the container wall. The fitting 190 is suitably sealed at the opening 192 such as with an appropriate caulking or the like.

In operation of this modified embodiment, when the motor is energized the ball 182 is drawn upwardly to the location shown by solid line in FIG. 7 to close the door 80 through operation of the line 184. This creates a vacuum within the container drawing air from the suction hose through the screen 172, around the ball 182 and through the screen 170, through the opening 160 and out the openings in the motor 64. This draws the vacuumed material 12 through the suction hose and into the storage compartment 62. After the material is removed the motor is deenergized allowing the ball 182 and door 80 to drop to the position shown by dashed lines of FIG. 6 and the vacuumed material is released into the bin storage chamber.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A loose material recovery apparatus comprising:
an overhead bin for containing said material, said bin having a storage chamber for storing the material;

a vacuum assembly above the storage chamber, said vacuum assembly further comprising a container having a side wall and a bottom door, an actuating member, and a motor; means for mounting the motor to said container and spaced above said bottom door to define a storage compartment therebetween within said container; the sidewall of the container being substantially impervious to the passage of said material therethrough; a suction hose connected to said container and communicating with said compartment, said suction hose directing the material to be recovered to said compartment; means for mounting said bottom door for movement between a closed position for retaining said material in said compartment, and an open position allowing said material to fall from said compartment into said bin storage chamber; said motor, when energized, creating a vacuum in said compartment with said bottom door closed, means for mounting said actuating member to said container for movement in response to energizing said motor, and means in response to movement of said actuating member with said motor energized for closing said bottom door;

whereby, with said motor energized the door closes and a vacuum is created within said compartment for drawing material to be recovered into said compartment.

2. The apparatus of claim 1 wherein said actuating member is a lid against which air from the motor when energized impinges to raise said member.

3. The apparatus of claim 1 further comprising a linkage between said actuating member and said bottom door, whereby movement of said actuating member imparts movement to said door through said linkage.

4. The apparatus of claim 3 wherein said bottom door is hinged to said container for pivotal movement between closed and open position, and wherein said linkage is connected near said hinge such that relatively small movement of said actuating member imparts relatively large pivotal movement to said door.

5. The apparatus of claim 1 wherein said motor is mounted to a barrier wall that separates said container into said storage compartment and a second compartment between said wall and said actuating member.

6. The apparatus of claim 1 wherein said door is mounted to said container for pivotal movement between closed and open positions.

7. The apparatus of claim 6 wherein said door is counterweighted for ease in closing upon energizing said motor.

8. The apparatus of claim 1 wherein said actuating member further comprises a member mounted for vertical movement in response to energizing and deenergizing said motor.

9. The apparatus of claim 8 wherein said member is a ball vertically movable within a tube, and further comprising means for connecting said ball to said door whereby vertical movement of said ball imparts movement to said door.

10. A loose material recovery apparatus comprising:
an overhead bin for containing said material, said bin having a storage chamber for storing the material;
a vacuum assembly above the storage chamber, said vacuum assembly further comprising a container having a door at the bottom thereof, a lid at the top thereof, and a vacuum motor, a barrier wall dividing said container into a lower storage compartment and an upper compartment, said motor mounted in said barrier wall such that when energized the motor draws air from the lower storage compartment to create a vacuum therein with the lower door closed and impinges said air against said lid, means for mounting said bottom door for movement between a closed position for retaining said material in said storage compartment and an open position allowing said material to fall from said storage compartment into said bin storage chamber, means for mounting said lid to said container for movement in response to energizing said motor, and linkage means connected between said lid and said bottom door such that movement of said lid by impingement of air thereon upon energizing said motor imparts movement of said lower door to a closed position; and
a suction hose connected to said vacuum assembly and communicating with said storage compartment for directing the material to be covered to said storage compartment;
whereby, with said motor energized, the lid moves by impingement of air thereon and acts through said linkage to close said bottom door, thus creating a vacuum within said storage compartment for drawing material to be recovered into said compartment.

11. The apparatus of claim 10 wherein upon deenergizing said motor said bottom door opens under its own weight allowing the recovered material to fall into said bin storage chamber.

12. The apparatus of claim 11 wherein said bottom door is hinged to said container for pivotal movement between closed and open positions, and wherein said linkage is connected near said hinge such that relatively small movement of said lid imparts relatively large pivotal movement to said door.

13. The apparatus of claim 12 wherein said door is counterweighted for ease in closing upon energizing said motor.

14. A vacuum assembly for the recovery of loose material, said vacuum assembly comprising a container having a bottom door, an actuating member, and a motor, means for mounting the motor within said container and spaced above said bottom door to define a storage compartment therebetween within said container, means for mounting said bottom door to said container for pivotal movement between a closed position for retaining said material in said compartment and an open position allowing said material to fall from said compartment, said motor when energized creating a vacuum in said compartment with said bottom door closed, means for mounting said actuating member to said container for movement in response to energizing said motor, and means to response to movement of said actuating member with said motor energized for closing said bottom door, whereby, with said motor energized the door closes and a vacuum is created within said compartment for drawing material to be recovered into said compartment.

15. The vacuum assembly of claim 14 wherein said actuating member is a lid against which air from the motor when energized impinges to raise said member.

16. The vacuum assembly of claim 14 further comprising a linkage between said actuating member and said bottom door, whereby movement of said actuating member imparts movement to said door through said linkage.

17. The vacuum assembly of claim 16 wherein said bottom door is hinged to said container, and wherein said linkage is connected near said hinge such that relatively small movement of said actuating member imparts relatively large pivotal movement to said door.

18. The vacuum assembly of claim 14 wherein said motor is mounted to a barrier wall that separates said container into said storage compartment and a second compartment between said wall and said actuating member.

19. The vacuum assembly of claim 14 wherein said door is counterweighted for ease in closing upon energizing said motor.

20. The vacuum assembly of claim 14 wherein said actuating member further comprises a member mounted for vertical movement in response to energizing and deenergizing said motor.

21. The vacuum assembly of claim 20 wherein said member is a ball vertically movable within a tube, and further comprising means for connecting said ball to said door whereby vertical movement of said ball imparts movement to said door.

22. A vacuum assembly for the recovery of loose material, said vacuum assembly comprising a container having a bottom door, a lid, and a motor, means for mounting the motor within said container and spaced above said bottom door to define a storage compartment therebetween within said container, means for mounting said bottom door for movement between a closed position for retaining said material in said compartment and an open position allowing said material to fall from said compartment, said motor when energized creating a vacuum in said compartment with said bottom door closed, means for mounting said lid to said container for movement in response to energizing said motor, and means in response to movement of said lid with said motor energized for closing said bottom door, whereby, with said motor energized the door closes and a vacuum is created within said compartment for drawing material to be recovered into said compartment.

23. A vacuum assembly for the recovery of loose material, said vacuum assembly comprising a container having a bottom door, an actuating member, and a motor, means for mounting the motor within said container and spaced above said bottom door to define a storage compartment therebetween within said container, said motor being mounted to a barrier wall that separates said container into said storage compartment and a second compartment between said wall and said actuating member, means for mounting said bottom door for movement between a closed position of retaining said material in said compartment and an open position allowing said material to fall from said compartment, said motor when energized creating a vacuum in said compartment with said bottom door closed, means for mounting said actuating member to said container for movement in response to energizing said motor, and means in response to movement of said actuating member with said motor energized for closing said bottom door, whereby, with said motor energized the door closes and a vacuum is created within said compartment for drawing material to be recovered into said compartment.

* * * * *